United States Patent
Matsubara et al.

(10) Patent No.: US 10,199,640 B2
(45) Date of Patent: Feb. 5, 2019

(54) NEGATIVE ELECTRODE MATERIAL FOR SECONDARY BATTERY AND SECONDARY BATTERY USING THE SAME

(71) Applicant: LG Chem, Ltd., Seoul (KR)

(72) Inventors: Keiko Matsubara, Tokyo (JP); Yoshiyuki Igarashi, Tokyo (JP); Mi-Rim Lee, Daejeon (KR); Hye-Ran Jung, Daejeon (KR); Yong-Ju Lee, Daejeon (KR)

(73) Assignee: LG Chem, Ltd. (KR)

( * ) Notice: Subject to any disclaimer, the term of this patent is extended or adjusted under 35 U.S.C. 154(b) by 207 days.

(21) Appl. No.: 15/103,479

(22) PCT Filed: Dec. 12, 2014

(86) PCT No.: PCT/KR2014/012286
§ 371 (c)(1),
(2) Date: Jun. 10, 2016

(87) PCT Pub. No.: WO2015/088283
PCT Pub. Date: Jun. 18, 2015

(65) Prior Publication Data
US 2016/0308196 A1    Oct. 20, 2016

(30) Foreign Application Priority Data

Dec. 13, 2013  (JP) .................................. 2013-258363
Dec. 11, 2014  (JP) .................................. 2014-250761

(51) Int. Cl.

| | |
|---|---|
| *H01M 4/36* | (2006.01) |
| *H01M 4/134* | (2010.01) |
| *H01M 4/38* | (2006.01) |
| *C01B 33/00* | (2006.01) |
| *H01M 4/62* | (2006.01) |
| *H01M 10/0525* | (2010.01) |
| *H01M 4/02* | (2006.01) |

(52) U.S. Cl.
CPC ............ *H01M 4/364* (2013.01); *C01B 33/00* (2013.01); *H01M 4/134* (2013.01); *H01M 4/386* (2013.01); *H01M 4/628* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 5,395,711 A | 3/1995 | Tahara et al. | |
| 6,090,505 A | 7/2000 | Shimamura et al. | |
| 7,597,997 B2 | 10/2009 | Sato et al. | |
| 9,508,990 B2 | 11/2016 | Hirono et al. | |
| 2002/0015890 A1 | 2/2002 | Nakura | |
| 2003/0134198 A1 | 7/2003 | Sawa et al. | |
| 2004/0062990 A1 | 4/2004 | Shimamura et al. | |
| 2004/0248011 A1 | 12/2004 | Asao et al. | |
| 2006/0024588 A1 | 2/2006 | Jito et al. | |
| 2013/0224599 A1 | 8/2013 | Park et al. | |
| 2014/0370386 A1* | 12/2014 | Hirono ................. | H01M 4/386 429/220 |

FOREIGN PATENT DOCUMENTS

| | | |
|---|---|---|
| EP | 1873846 A1 | 1/2008 |
| JP | H06325765 A | 11/1994 |
| JP | 2001297766 A | 10/2001 |
| JP | 2004103340 A | 4/2004 |
| JP | 2005011802 A | 1/2005 |
| JP | 2007165300 A | 6/2007 |
| JP | 2013179033 A | 9/2013 |
| JP | 2014160554 A | 9/2014 |
| JP | 2014186992 A | 10/2014 |
| KR | 10-0388812 B1 | 6/2003 |
| KR | 10-0582343 B1 | 5/2006 |
| KR | 20080009269 A | 1/2008 |
| KR | 10-1226245 B1 | 2/2013 |
| WO | 2004109839 A1 | 12/2004 |

OTHER PUBLICATIONS

International Search Report from PCT/KR2014/012286, dated Mar. 30, 2015.

* cited by examiner

*Primary Examiner* — Wyatt P McConnell
(74) *Attorney, Agent, or Firm* — Lerner, David, Littenberg, Krumholz & Mentlik, LLP

(57) ABSTRACT

Alloy particles for negative electrode active material are proposed, which can impart anti-oxidation property to Si-containing alloy particles, and suppress oxidation of the negative electrode active material due to electrolyte at a considerably high level. A negative electrode material of secondary battery is achieved by a negative electrode material of secondary battery which is capable of intercalating and de-intercalating lithium and which consists of alloy particles including a silicon phase, a metal phase and bismuth, in which a crystallite size of the silicon phase is 10 nm or smaller, and the metal phase includes at least one kind of metal alloying with silicon but not with lithium, and the negative electrode material includes primary particles formed at least by the silicon and the metals.

11 Claims, No Drawings

NEGATIVE ELECTRODE MATERIAL FOR SECONDARY BATTERY AND SECONDARY BATTERY USING THE SAME

CROSS-REFERENCE TO RELATED APPLICATION

This application is a national phase entry under 35 U.S.C. § 371 of International Application No. PCT/KR2014/012286, filed Dec. 12, 2014, which claims priority to Japanese Patent Application No. 2013-258363, filed Dec. 13, 2013 and Japanese Patent Application No 2014-250761, filed Dec. 11, 2014, the disclosures of which are incorporated herein by reference.

TECHNICAL FIELD

The present disclosure relates to a negative electrode material of a secondary battery, and a secondary battery using the same.

BACKGROUND ART

Recent development and distribution of mobile tools and electric motors have led into increased demand for high-capacity energy sources such as lithium secondary batteries, for representative example. At present, carbon material such as graphite, hard carbon, etc. is used for the negative electrode active material of the lithium secondary battery.

For example, graphite has a theoretical capacity of 372 mAh/g defined by the first stage structure $C_6Li$ formed by intercalation reaction, and it has been used in increasing amount to achieve higher capacity of the battery so far, but now reached the limit. Further, hard carbon may be used and may achieve capacity exceeding the theoretical capacity of graphite, but it can hardly realize high-capacity secondary battery, considering factors such as low initial efficiency, low electrode density, and so on. Considering the above, use of silicon for a negative electrode active material has been proposed, since silicon, as a novel material that can replace the carbon material, exhibits theoretical capacity as high as 4200 mAh/g by alloying with lithium.

Japanese Unexamined Patent Application Publication No. Hei 6-325765 (Patent Document 1) proposes lithium ion intercalating and de-intercalating material consisting of Li-containing silicon oxide or silicate. Use of silicon oxide mixed in a small amount with graphite has been commercialized, since silicon oxide having the coexistence of amorphous or microcrystalline silicon phase and silicon oxide in single particles can provide relatively superior charge-discharge cycle characteristics. However, in practice, considerably low initial efficiency hinders its use in an increased mixing amount. Further, when a material containing high-capacity silicon is used as a negative electrode active material, expansion/contraction of silicon (phase) during charging and discharging can be accompanied with pulverization, which leads into formation of insufficient conducting paths in the electrodes and subsequently, rapid capacity fading as well as deterioration of charge-discharge cycle characteristics could occur.

In order to address the issues related with the use of high-capacity silicon-based materials as the negative electrode active material, WO2004/109839 (Patent Document 2) proposes a negative electrode with amorphous silicon thin film or amorphous thin film containing silicon as a main component, directly deposited on a current collector by sputtering, and so on. According to the constitution of Patent Document 2, it appears possible to reduce thickness increase of an active material layer after charging and discharging, since it is possible to provide superior charging and discharging capacity and cycle characteristics, and suppress porosification of the active material layer due to charging and discharging.

Additionally, Japanese Unexamined Patent Application Publication No. 2001-297766 (Patent Document 3) discloses that, by employing alloy particles of silicon phase including silicon with Li intercalating capability and metal phase without Li intercalating capability, it is possible to enhance cycle life because volume change of the silicon phase and pulverization of the negative electrode material, which can occur along with Li intercalation/de-intercalation, are suppressed. Additionally, Patent Document 3 states that, by employing gas atomization method in the fabrication of the above-mentioned alloy particles, it is advantageously possible to fabricate a negative electrode with high charging density, since grinding is not necessary, spherical micropowder can be fabricated, and the negative electrode material in the spherical micropowder form as obtained provide superior chargeability.

Japanese Unexamined Patent Application Publication No. 2007-165300 (Patent Document 4) suggests fabrication of alloy particles containing metal-state Fe and including a phase (A phase) containing at least Si and a phase (B phase) containing an intermetallic compound of at least one type of transition metal element mentioned above and Si, by performing mechanical alloying treatment. According to this suggestion, it is possible to suppress deterioration of storage characteristic due to metal-state Fe dissolving in the negative electrode in the event of storage under overdischarge condition, and additionally, the mechanical synthesis is a way of not only obtaining amorphous or low-crystalline state easily, but also obtaining homogeneous alloy particles.

Indeed, Patent Documents 2 to 4 provide brilliant suggestions for sufficiently retaining high capacity of silicon. However, considering the property of silicon which is hard, but soft at the same time, it needs such a structure that can respond to expansion/contraction in order to completely suppress pulverization.

Further, nonaqueous lithium secondary battery forms solid electrolyte interface (SEI) film on the surface of negative electrode during initial charging and discharging. For example, when graphite is used, it is understood that the SEI film formed by reaction with electrolyte during initial charging becomes stable film which acts to suppress reaction of the second cycle and then on. However, it has yet to be discovered about whether silicon develops SEI film or not. For example, even if SEI film is formed on the surface of silicon or Si-containing active material by the initial charging as in the case of graphite, it is expected that silicon (phase) would break down at least partly due to expansion thereof, and side reaction would occur during the second cycle and every charging thereafter, leaving deposit of the side reaction products or oxidized silicon, and thus resulting in deteriorated charge-discharge cycles.

DISCLOSURE

Technical Problem

The present disclosure is designed to solve the problems of the related art, and therefore, it is urgently necessary to not only microcrystallize an alloying material containing silicon and other specific metals, but also develop a negative electrode material for use in nonaqueous electrolytic secondary battery with enhanced flexibility and anti-oxidation property.

Other objects and advantages of the present disclosure will be understood by the following description, and it is understood that these can be achieved by means, methods or a combination thereof which are defined in the claims.

Technical Solution

The present inventors have discovered that, by incorporating bismuth in the alloy particles including a silicon phase and a metal phase consisting of specific metals, it is possible to imparting anti-oxidation property and also facilitate microcrystallization in the fabrication of the alloy particles, and as a result, suppress discoloration of the Si-containing alloy particles, reduce and restrict expansion rate of silicon, and suppress pulverization of silicon during charging and discharging, thus leading to realization of high-capacity secondary battery and excellent charge-discharge cycle characteristics. The present disclosure is made based on the finding stated above.

Accordingly, in one aspect of the present disclosure, there is provided a negative electrode material of a secondary battery capable of intercalating and de-intercalating lithium, which consists of alloy particles including a silicon phase, a metal phase, and bismuth, in which a crystallite size of the silicon phase is 10 nm or smaller, the metal phase includes at least one kind of metal that alloy with silicon but not with lithium, and primary particles are formed by silicon, metals and bismuth.

Further, in another aspect of the present disclosure, there is provided a fabrication method of a negative electrode material of a secondary battery including: preparing silicon, at least one kind of metal alloying with silicon but not with lithium, and bismuth; preparing a master alloy with at least the silicon and the at least one kind of metal; and forming alloy particles including a silicon phase, a metal phase and bismuth, which have a crystallite size of 10 nm or smaller, by performing mechanical alloying of the master alloy.

Advantageous Effects

The present disclosure gives the following effects. The negative electrode material of a secondary battery according to the present disclosure can impart anti-oxidation property to Si-containing alloy particles, and can suppress oxidation of negative electrode active material, and above all, suppress oxidation by electrolyte at a considerably high level. As a result, charge-discharge cycle characteristics can be improved at a higher level, since the electrode structure and conductivity of the battery are maintained at an initial state as possible. Further, utilization of silicon is not deteriorated by repeated charging and discharging, and good cycle characteristics can be maintained without suffering deterioration, since expansion due to charging is suppressed within a yield stress range of silicon by microcrystallization, and also, pulverization that accompanies charging and discharging can be suppressed at a higher level.

According to the present disclosure, a fabricating method of a negative electrode active material of a secondary battery can microcrystallize Si-containing alloy particles to nm scale or smaller, by employing a master alloy preparation process using liquid quenching such as roll quenching, gas atomizing, and so on, and mechanical alloying process, and by adding bismuth during any one of the processes. As a result, the coefficient of silicon expansion is reduced, expansion of electrodes is suppressed, conductivity is enhanced, and uniform distribution of silicon particles in electrodes is achieved, and as a result, a composite material capable of providing excellent charge-discharge cycle characteristics can be fabricated.

BEST MODE (Crystallite)

The term 'crystallite' as used herein refers to a largest aggregate of particle considered as single crystal, and that one particle is assembled by a plurality of crystallites.

(Crystallite Size)

The crystallite size is calculated by the Scherrer equation below, based on full width at half maximum (FWHM) of the single-phase silicon and metal phase measured in a range of $2\theta=10{\sim}89.5°$, using CuKα radiation (wavelength=1.5406 Å) with a Bruker X-ray diffractometer.

$$D(\text{Å})=K^*\lambda/(\beta^*\cos\theta)$$

(where, K is an integer, λ is X-ray wavelength, β is full width at half maximum (FWHM), θ is a diffraction angle 2θ/θ)

(Volume Cumulative Particle Size Distribution)

The 'volume cumulative particle size distribution' refers to particle size distribution obtained based on one arbitrary powder group. When a cumulative curve is obtained from the particle size distribution with reference to the entire volume (100%) of the powder group, the diameters at 10%, 50% and 90% of the cumulative curve are expressed as 10% diameter, 50% diameter (cumulative middle diameter: median diameter), and 90% diameter (μm), respectively.

(Mechanical Alloying)

The 'mechanical alloying' refers to one of alloy powder forming methods, which is the method of fabricating uniform alloy particles retained in solid state, through solid-state reaction occurred by repeating mixing of two or more types of metal components (powders) and grinding. Using mechanical energy, it is possible to obtain alloy powder with homogeneous compositions within the powders and less segregation, because two or more types of metal components (powders) can be alloyed/pulverized at a temperature below melting point thereof.

[Negative Electrode for Secondary Battery]

The 'negative electrode material for secondary battery' according to the present disclosure consists of alloy particles including silicon phase, metal phase and bismuth.

(Silicon Phase)

The 'silicon phase' refers to a single phase consisting of silicon and therefore, it does not contain other metal elements and components.

The 'silicon phase' has a crystallite size of 10 nm or smaller, or preferably, 5 nm or smaller.

The silicon content with respect to the alloy particles is from 40 wt % to 85 wt %, preferably with a lower limit of 50 wt % or higher, or more preferably, 55 wt % or higher, and an upper limit of 80 wt % or lower, or more preferably, 75 wt % or lower.

With respect to weight (100) of silicon (in all forms) contained in the entire alloy particles, the ratio of silicon of a single phase consisting of silicon ('silicon phase') is from 30 wt % to 70 wt %, preferably with an upper limit of 50 wt % or lower.

(Metal Phase)

The 'metal phase' consists of at least one kind of metal which alloys with silicon, but not with lithium.

Preferably, the at least one kind of metal may be a mixture of at least one or two selected from the group consisting of Co, Cr, Cu, Fe, Mn, Mo, Ni and Ti, among which Co, Cr or Ti is more preferable.

According to the present disclosure, the at least one kind of metal may preferably not exist as single substance in the negative electrode material.

The crystallite size of the metal phase other than silicon in the alloy particles is 30 nm or smaller, or preferably, 10 nm or smaller, or more preferably, 5 nm or smaller.

(Bismuth)

According to the present disclosure, adding bismuth can not only impart anti-oxidation property to the Si-containing alloy particles, but also significantly enhance brittleness of the alloy particles, and suppress, at a high level, the silicon pulverization that occurs during charging and discharging. Specifically, when bismuth-containing alloy particles are used as the negative electrode active material of a secondary battery, it is possible to maintain or enhance charge-discharge cycle characteristics since oxidation due to reaction with the electrolyte is suppressed and formation of the non-conductive film as a side-reaction product on the surface of the active material is diminished, thus maintaining alloying/dealloying reaction with lithium. Further, it acts as a desirable component in the fabrication process of the alloy particles described below.

According to a preferred aspect of the present disclosure, bismuth content in the alloy particles with respect to the alloy particles is more than 0 wt % but does not exceed 5 wt %, and preferably, more than 0 wt % but does not exceed 3 wt %.

With the bismuth added in such range, it is possible to realize amorphication or microcrystallization of the alloy particles, while suppressing expansion coefficient of the electrode.

(Alloy Particles)

The alloy particle consists of silicon phase, metal phase and bismuth. According to the present disclosure, the alloy particle is preferably subjected to mechanical alloying to achieve more amorphication or microcrystallization. According to a more preferred aspect of the present disclosure, it preferably consists of alloy particles in the shape of secondary particles which are formed as approximately 0.01 μm primary particles are granulated during microcrystallization by mechanical alloying, etc.

<Primary Particles and Secondary Particles>

According to a preferred aspect of the present disclosure, the average particle diameter of the primary particles by silicon, metal, and bismuth is from 0.01 μm to 1 μm, preferably with a lower limit of 0.05 μm or higher, and an upper limit of 0.2 μm or lower.

Further, according to the present disclosure, the secondary particle, which are crystallized aggregate of the primary particles, have average particle diameter from 0.1 μm to 20 μm, preferably with a lower limit of 0.5 μm or higher, and an upper limit of 10 μm or lower, or more preferably, with a lower limit of 1 μm or higher, and an upper limit of 5 μm or lower.

<Aspect Ratio>

According to a preferred aspect of the present disclosure, the aspect ratio of the secondary particles of the alloy particles is 5 or lower, or preferably, 3 or lower. When the aspect ratio approaches 1 and thus the shape is almost sphere, a filling rate of the alloy particles in the electrode increases, and at the same time, when a mixture of the alloy powder with carbon material such as graphite, etc. is used as a negative electrode material, filling into graphite pores increases, thus facilitating formation of conductive pathways.

<X-Ray Diffraction>

According to the present disclosure, it is preferred that the alloy particles preferably have a portion in which silicon forms an intermetallic compound with metal, and a portion in which silicon is present as a single substance, and the peak of (111) plane of silicon obtained by X-ray diffraction is not observed.

Further, according to a preferred aspect of the present disclosure, the crystallite size of all phases included in the alloy particles is 30 nm or smaller, preferably, 10 nm or smaller, or more preferably, 5 nm or smaller, by X-ray diffraction measurement.

For example, the X-ray diffraction measurement may be done at a $2\theta=10\sim89.5°$ range, using CuK$\alpha$ radiation (wavelength=1.5406 Å) with a Bruker X-ray diffractometer. Further, the crystallite size may be obtained using Scherrer equation based on the full width at half maximum (FWHM) of silicon single phase and metal phase.

With the secondary battery using the negative electrode material according to the present disclosure, microcrystallization proceeds to such an extent that the highest intensity plane (111) peak of the silicon that can be obtained by X-ray diffraction is not observable, so that expansion due to charging is suppressed within the silicon yield stress. Further, since mechanical alloying, etc. causes the metal phases other than silicon to have complex coexistence of a plurality of phases, unclear boundaries among respective crystal phases, and resultant structure which is hard and does not break easily, the metal phases other than silicon can suppress expansion of silicon phase expansion and thus prevent pulverization from occurring due to charging and discharging, and utilization of silicon can maintain excellent cycle characteristics without decreasing by repeated charging and discharging <Volume Cumulative Particle Size Distribution>

According to a preferred aspect of the present disclosure, 50% diameter in the volume cumulative particle size distribution of the negative electrode material (alloy particles) is from 1 μm to 5 μm. Further, the 90% diameter in the volume cumulative particle size distribution of the negative electrode material is 30 μm or smaller, preferably, 15 μm or smaller, or more preferably, 7 μm or smaller.

The 50% and 90% diameters in the volume cumulative particle size distribution may be obtained using Nikkiso laser diffraction particle size distribution analyzer, based on cumulative frequencies as measured after 3 min dispersion by embedded ultrasound.

[Fabricating Method of Negative Electrode Material of Secondary Battery]

The fabricating method according to the present disclosure forms master alloy with silicon, at least one kind of metal and bismuth (as necessary), and employs mechanical alloying treatment.

(Raw Materials)

As described above at [Negative electrode material of secondary battery], the raw materials such as silicon, at least one kind of metal, bismuth, and so on may be used.

(Fabrication of Master Alloy)

According to the present disclosure, a process of fabricating a master alloy (powder) by preparing the master alloy with silicon and metals is employed. In this case, bismuth may be preferably added.

To prepare microcrystalline structure alloy powders, liquid quenching such as roll quenching or gas atomization, in-rotating liquid spinning process, melt spinning, and so on may be used. The faster quench speed may render microcrystalline alloy powders with smaller crystallite size. According to a preferred aspect of the present disclosure, gas atomization treatment is preferably used for alloying (pulverizing). The roll quenching or melt spinning have faster quench speeds than the gas atomization, but because certain types of raw material or metals adhere onto roll, these methods have limited choices of the raw materials or compositions. The gas atomization method provides relatively a wider range of raw materials that can be selected and also can provide spherical powder which does not require grinding. Additional advantages such as ability to control obtained particle size depending on types of gases or conditions for ejecting the same, also make this method a preferable choice.

(Mechanical Alloying Treatment)

According to the present disclosure, the master alloy (powder) is treated by mechanical alloying.

The treatment by mechanical alloying enables the Si-containing alloy particles to form into sufficiently amorphous or microcrystalline state.

<Addition of Bismuth>

Bismuth can be added during preparing master alloy (pulverizing) and/or performing mechanical alloying treatment, or preferably, added during mechanical alloying treatment.

Bismuth has a melting point of 271° C. which is considerably lower than that of silicon (1414° C.), and depending on the fabricating method of the master alloy, disadvantages due to bismuth evaporation can occur. Accordingly, depending on the conditions of the fabricating method of the master alloy, bismuth powder may be added preferably during mechanical alloying treatment, rather than during forming of the master alloy.

Further, during preparation of the alloy particles, bismuth, with its soft property, can accelerate the alloy particles forming into amorphous or microcrystalline state during mechanical alloying treatment. Moreover, in the master alloy preparation process under inert atmosphere and mechanical alloying, the surface of the alloy particles can experience slight oxidation when exposed to atmosphere, but adding bismuth can suppress such oxidation.

<Apparatus>

As for an apparatus for implementing mechanical alloying, planetary ball mill, vibrating mill, stirred ball mill, rotating ball mill, etc. may be used, each of which may be optimized by appropriately defining overall conditions including amount of master alloy powder, size or amount of balls, revolutions per minute (RPM)/vibration frequency, etc. to achieve 10 nm or smaller silicon crystallite size.

[Negative Electrode for Secondary Battery]

According to the present disclosure, a negative electrode of (lithium) secondary battery having negative electrode material of secondary battery can be proposed. Further, according to a preferred aspect of the present disclosure, a negative electrode of secondary battery having carbon nanotube as a conducting agent can be proposed.

<Conducting Agent>

According to a more preferred aspect of the present disclosure, the conducting agent is included in an amount from 0.1 wt % to 5 wt % with respect to the total weight of negative electrode of a secondary battery, preferably with a lower limit of 0.5 wt % or higher, or more preferably, 1.0 wt % or higher.

[Secondary Battery]

According to the present disclosure, a secondary battery, or preferably, a lithium secondary battery is proposed, which includes a positive electrode, a negative electrode, a non-aqueous electrolyte, and a separator, in which the negative electrode is the negative electrode of secondary battery according to the present disclosure.

Generally, a lithium secondary battery includes a positive electrode consisting of a positive electrode active material and a positive electrode current collector, a negative electrode consisting of a negative electrode active material and a negative electrode current collector, and a separator which blocks electron conducting pathways between positive electrode and negative electrode to thus conduct lithium ions, in which Li salt-containing organic electrolyte to conduct lithium ions is injected into gaps of the electrodes and the separator material.

(Positive Electrode)

For the positive electrode active material, Li-containing transition metal oxide such as, for example, any one of, or a mixture of two or more selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $0\leq y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$), and $Li_xFePO_4$ ($0.5<x<1.3$) may preferably be used. Further, in addition to the Li-containing transition metal oxide, sulfide, selenide, halide, etc. may be used.

Further, a mixture of $Li_xCoO_2$ ($0.5<x<1.3$) and $Li_x(Ni_aCo_bMn_c)O_2$ ($0.5<x<1.3$, $0<a<1$, $0<b<1$, $0<c<1$, $a+b+c=1$) may be used as the positive electrode active material. Specifically, $Li_x(Ni_aCo_bMn_c)O_2$ ($0.5<x<1.3$, $0<a<1$, $0<b<1$, $0<c<1$, $a+b+c=1$) is preferable in view of the fact that it can exhibit high output characteristic at high voltage condition.

For example, the positive electrode is fabricated by applying a mixture of the positive electrode active material described above, the conducting agent and the binder on the positive electrode current collector, and drying the same. Depending on need, filler may also be added to the mixture.

The positive electrode current collector is fabricated to a thickness from 3 μm to 500 μm. The positive electrode current collector may be used, as long as it has high conductivity and does not induce chemical changes in the battery. For example, stainless steel, aluminum, nickel, titanium, sintered carbon may be used, or aluminum or stainless steel surface-treated with carbon, nickel, titanium, silver, and so on may be used. The positive electrode current collector may have micro bumps on surface thereof to enhance adhesivity of the positive electrode active material, and may have a variety of forms such as film, sheet, foil, net, porous body, foam, nonwoven fabric, and so on.

Generally, the conducting agent is added in an amount of 1 wt % to 50 wt % based on the total weight of the mixture containing the positive electrode active material. The conducting agent may be used, as long as it has conductivity and does not induce chemical changes in the battery. For example, a conductive material such as, graphite such as natural graphite, artificial graphite, and so on; carbon black such as carbon black, acetylene black, Ketjen black (Trademark), carbon nanotubes, carbon nanofiber, channel black, furnace black, lamp black, thermal black, and so on; conductive fiber such as carbon fiber, metal fiber, and so on; metal powder such as fluorocarbon, aluminum, nickel powders, and so on; conductive whisker such as zinc oxide, potassium titanate, and so on; conductive metal oxide such as titanium oxide, and so on; polyphenylene derivative, and so on, may be used.

The binder promotes bonding between active material and the conducting agent, etc., or bonding of the active material to the current collector. Generally, the binder is added in an amount of 1 wt % to 50 wt % based on the total weight of the mixture containing the positive electrode active material. For example, a variety of copolymer such as polyvinylidene fluoride, polyvinyl alcohol, polyimide, carboxymethyl cellulose (CMC), starch, hydroxypropyl cellulose, regenerated cellulose, polyvinylpyrrolidone, tetrafluoroethylene, polyethylene, polypropylene, ethylene-propylene-diene copolymer (EPDM), sulfonated EPDM, styrene-butylene rubber, fluoride rubber, may be used.

The filler is a component that suppresses expansion of the positive electrode and may be selectively used as long as it is fibrous and does not induce chemical changes in the battery. For example, it may be olefin-based polymer such as polyethylene, polypropylene, and so on; and a fibrous material such as glass fiber, carbon fiber, and so on.

(Negative Electrode)

The negative electrode uses the [negative electrode material of secondary battery] according to the present disclosure as a negative electrode active material.

For example, the negative electrode is fabricated by applying a mixture of the negative electrode active material described above, the conducting agent and the binder on the negative electrode current collector, and drying the same. Depending on need, filler may also be added to the mixture.

The negative electrode current collector is fabricated to a thickness from 3 μm to 500 μm. The negative electrode current collector may be used, as long as it has conductivity and does not induce chemical changes in the battery. For example, copper, steel, stainless steel, aluminum, nickel, titanium, sintered carbon may be used, or copper or stainless steel surface-treated with carbon, nickel, titanium, silver, and so on, or aluminum-cadmium alloy may be used. The negative electrode current collector may have micro bumps on surface thereof to enhance adhesivity of the negative electrode active material, and may have a variety of forms such as film, sheet, foil, net, porous body, foam, nonwoven fabric, and so on.

The same conducting agent, binder, or filler as set forth above under (Positive electrode) may be used, but not limited thereto.

(Separator)

The separator is interposed between the positive electrode and the negative electrode. An insulative thin film having high ion permeability and mechanical strength is used. The separator generally has a pore diameter of 0.01 μm to 10 μm, and a thickness of 5 μm to 300 μm. For such separator, a sheet or a nonwoven fabric formed of, for example, olefin-based polymer such as chemically resistant or hydrophobic polypropylene, and so on; glass fiber or polyethylene, may be used. When the solid electrolyte such as polymer, and so on is used for the electrolyte, the solid electrolyte may act also as a separator.

(Nonaqueous Electrolyte)

The nonaqueous electrolyte is an electrolytic compound and may contain cyclic carbonate and/or linear carbonate. The example of the cyclic carbonate may include ethylene carbonate (EC), propylene carbonate (PC), gamma-Butyro-lactone (GBL), fluoroethylene carbonate (FEC), and so on. The example of the linear carbonate may preferably include at least one selected from the group consisting of diethyl carbonate (DEC), dimethyl carbonate (DMC), ethyl methyl carbonate (EMC), and methyl propyl carbonate (MPC), but not limited thereto. Further, the nonaqueous electrolyte includes lithium salt as well as the carbonate compound, which may be preferably selected from the group consisting of $LiClO_4$, $LiCF_3SO_3$, $LiPF_6$, $LiBF_4$, $LiAsF_6$ and $LiN(CF_3SO_2)_2$ for example, but not limited thereto.

(Fabrication)

The secondary battery according to the present disclosure is fabricated with a general method of inserting a porous separator between positive electrode and negative electrode, and injecting nonaqueous electrolyte. The secondary battery according to the present disclosure may be used without being limited to any exterior shape (e.g., cylinder, rectangular, pouch-type, etc.).

MODE FOR DISCLOSURE

Working Example 1

(Preparation of Alloy Powders)

The raw material powders were mixed at a ratio of Si:Cr:Ti:Bi=70:14:13:3 (wt %). After alloy particles were prepared with gas atomization, the particles were seived through so that the particle diameter was adjusted to below 45 μm. The alloy powder was added with 1 wt % stearic acid, and placed into a receptacle of a vibrating mill along with 15 mm-diameter steel balls to fill 80% the vibrating mill receptacle. After substitution with nitrogen gas, mechanical alloying treatment was conducted at 1200 cpm vibrating frequency for 24 hr. The X-ray diffraction measurement on the obtained alloy powder revealed that the peaks were not observed from the (111) plane of silicon and that it was sufficiently amorphous.

(Fabrication of Secondary Battery)

<Fabrication of Negative Electrode>

After passing the obtained alloy powder through an electromagnetic sieve to a diameter below 38 μm, the alloying material and the graphite having average particle diameter of 15 μm were mixed at a weight ratio of 25:75, so that a negative electrode active material was prepared. A mixture of 94 wt % of negative electrode active material, 2 wt % of carbon nanotubes as the conducting agent, and 4 wt % of polyvinylidene fluoride as the binder, was prepared and formed into slurry with N-methyl-2-pyrrolidone, which was applied onto 20 μm-thick copper foil to a thickness of approximately 100 μm. After vacuum-drying at 120° C. and pressing, a negative electrode of electrode density of 1.7 g/cc was prepared by punching out a 13 mm-diameter disc.

<Fabrication of Positive Electrode>

0.3 mm-thick metal lithium was used for the positive electrode.

<Preparation of Electrolyte>

Ethylene carbonate and diethyl carbonate were mixed at a ratio of 3:7, and electrolyte solution containing 1 mole of $LiPF_6$ were used.

2016-type coin cell was fabricated with the constituent materials described above.

Working Example 2

The coin cell was fabricated in the same manner as Example 1 except that the respective raw material powders were mixed at a ratio of Si:Cr:Ti=73:14:13 (wt %) and that Bi was not added.

Comparative Example 2

Tin (Sn) having expandability as high as Bi was used in place of Bi. The coin cell was fabricated in the same manner as Example 1 except that the respective raw material powders were mixed at a ratio of Si:Cr:Ti:Sn=70:14:13:3 (wt %) and the alloy particles were prepared by gas atomization.

The battery characteristics and analysis of Examples and Comparative Examples are listed in Table 1.

<Evaluation Test 1: Charge-Discharge Cycle Test>

The coin cells (secondary batteries) of the Examples and Comparative Examples were subjected to 50 repetitious charge-discharge cycles at 0.5 C current rate. After finishing 51st charge cycle state, the coin cells were disassembled and the thickness of the electrodes was measured.

The thickness was divided by (discharge capacity at 50th cycle×weight of active material containing conducting agent per unit area as measured before charging). As a result, volume of the mixed active material layer per capacity of the 51st charge cycle state was calculated. Table 1 below lists the result.

TABLE 1

| Example | Initial efficiency (%) | Capacity retention (%) after 50th cycle | Electrode volume (%) per capacity at 51st charge cycle (relative to Example 1) |
|---|---|---|---|
| Ex. 1 | 89.5 | 89.5 | 100 |
| Ex. 2 | 88.8 | 83.4 | 108 |
| Comp. Ex. 1 | 89.0 | 82.7 | 111 |
| Comp. Ex. 2 | 87.6 | 82.0 | 113 |

<Overall Evaluation>

According to the present disclosure, by adding bismuth to silicon, and to at least one kind of metal alloying with silicon but not with lithium, and performing mechanical alloying, it is possible to suppress expansion experienced during charging and discharging, also enhance anti-oxidation property and thus enhance service life characteristic.

What is claimed is:

1. A negative electrode material for a secondary battery capable of intercalating and de-intercalating lithium, wherein the negative electrode material comprises alloy particles, the alloy particles including a silicon phase, a metal phase, and bismuth,
   wherein the silicon phase has a crystallite size of 10 nm or smaller,
   the metal phase includes at least one kind of metal alloying with silicon but not with lithium.

2. The negative electrode material according to claim 1, further comprising granulated alloy particles, wherein the alloy particles have an average particle diameter of 0.01 μm to 1 μm and the
   granulated alloy particles are in a granule form granulated from the alloy particles, and have an average particle diameter of 0.1 μm to 20 μm and
   the granulated alloy particles have an aspect ratio of 5 or lower.

3. The negative electrode material according to claim 1, wherein the alloy particles include a portion in which the silicon is in an intermetallic compound with the at least one kind of metal, and a portion in which the silicon is present as a silicon single substance, and
   no peak is observed at (111) plane of the silicon obtained by X-ray diffraction measurement, and all the crystallite sizes of the alloy particles on the rest of the planes as calculated by diffraction spectra are 30 nm or smaller.

4. The negative electrode material of claim 1, wherein a content of the bismuth included in the alloy particles is 5 wt % or lower.

5. The negative electrode material of claim 1, wherein a content of the silicon included in the alloy particles is 40 wt % or higher.

6. The negative electrode material of claim 1, wherein the alloy particles are present in an amorphous or a microcrystalline state.

7. A negative electrode for a secondary battery comprising the negative electrode material as set forth in claim 1.

8. A secondary battery, comprising a positive electrode, a negative electrode, a nonaqueous electrolyte, and a separator, wherein the negative electrode is as set forth in claim 7.

9. The secondary battery of claim 8, wherein the secondary battery is a lithium secondary battery.

10. A fabricating method of the negative electrode material for a secondary battery as set forth in claim 1, the fabricating method comprising:
    preparing silicon, at least one kind of metal alloying with the silicon but not with lithium, and bismuth;
    forming at least the silicon and the at least one kind of metal into a master alloy, and
    forming alloy particles including a silicon phase, a metal phase, and bismuth, having a crystallite size of 10 nm or smaller, by subjecting the master alloy to mechanical alloying.

11. The fabricating method of claim 10, wherein the bismuth is added during forming of the master alloy and/or performing of the mechanical alloying.

* * * * *